United States Patent
Hansen et al.

(10) Patent No.: US 7,126,524 B2
(45) Date of Patent: Oct. 24, 2006

(54) MOTION COMPENSATION FOR CONVOLUTIONAL SAR ALGORITHMS

(75) Inventors: Charles T. Hansen, Palos Verdes Estates, CA (US); Michael E. Lawrence, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 238 days.

(21) Appl. No.: 10/911,438

(22) Filed: Aug. 4, 2004

(65) Prior Publication Data

US 2006/0028370 A1    Feb. 9, 2006

(51) Int. Cl.
*G01S 13/90* (2006.01)
(52) U.S. Cl. .................... 342/25 A; 342/25 F
(58) Field of Classification Search ............. 342/25 A, 342/25 F See application file for complete search history.

(56) References Cited

U.S. PATENT DOCUMENTS 6,046,695 A * 4/2000 Poehler et al. ............ 342/25 A

* cited by examiner

*Primary Examiner*—Dan Pihulic
(74) *Attorney, Agent, or Firm*—Leonard A. Alkov; Karl A. Vick

(57) ABSTRACT

A synthetic aperture image of a scene is acquired using a radar system. The scene has one or more radar scatterers located on a horizontal flat $\hat{x},\hat{y}$ plane. The radar system is mounted on a moving platform moving at an angle $\theta_{tilt}$ with respect to the $\hat{x},\hat{y}$ plane, with a component of motion in a perpendicular $\hat{z}$ direction. The synthetic aperture image acquisition requires digitizing radar returns having a phase returned from scatterers in the scene, adjusting the phase of the radar returns in response to $\theta_{tilt}$ to generate phase adjusted returns, then computing the synthetic aperture image from said phase adjusted returns. The phase adjustment takes into account $\theta_{tilt}$ platform motion with respect to the scene.

4 Claims, 3 Drawing Sheets

MOTION COMPENSATION FOR CONVOLUTIONAL SAR ALGORITHMS

This application is a continuation in part of U.S. Patent and Trademark Office application Ser. No. 10/919,733, filed Aug. 17, 2004 titled Conformal Range Migration Algorithm (CRMA) KARMA (03W138), as well as application Ser. No. 10/967,956, filed Oct. 19, 2004 titled Mensuration for the Conformal Range Migration Algorithm.

BACKGROUND OF THE INVENTION

1. Field of Invention

This invention is in the field of motion compensation of radar returns for use with Synthetic Aperture Radar imaging.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up a frame length. During the frame length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the frame length.

The plurality of pulses transmitted during an SAR frame length, when coherently combined and processed, result in image quality comparable to a longer antenna, corresponding approximately to the "length" traveled by the antenna during the frame length.

The clarity of a SAR image is in many respects is dependent on the quality of the motion compensation applied to each radar return prior to SAR image computation. The SAR process depends on the coherent, phase accurate summing of radar returns. Slight deviations in the accuracy of the motion compensation of incoming pulses introduces distortions over the whole SAR image, reducing its utility.

SUMMARY OF THE INVENTION

Motion compensation for coherent combination of pulses is improved by a method for acquiring a synthetic aperture image of a scene using a radar system, said scene having one or more radar scatterers located on a horizontal, flat $\hat{x}$, $\hat{y}$ plane, said radar system mounted on a moving platform moving at an angle $\theta_{tilt}$ with respect to said $\hat{x}$, $\hat{y}$ plane, with a component of motion in a $\hat{z}$ direction, said $\hat{z}$ direction perpendicular to said $\hat{x}$, $\hat{y}$ plane. The method comprises the steps of:

digitizing radar returns having a phase from said scene;

adjusting said phase of said radar returns in response to said $\theta_{tilt}$ to generate phase adjusted returns;

computing said synthetic aperture image from said phase adjusted returns.

Said phase of said radar returns is adjusted by computing a nominal aircraft track $x_{ac,o}(s)$ $$x_{ac,o}(s) = s\cos(\theta_{tilt})\hat{x} + y_{ac,o}\hat{y} + z_{ac,o}\hat{z} + s\sin(\theta_{tilt})\hat{z}$$

an aircraft position parameter s given by $$s = \frac{1}{\cos(\theta_{tilt})}\left[x_o + \frac{x_{ac} - x_o}{y_{ac} - y_o}(y_{ac,o} - y_o)\right]$$

a Fast Time Scale Factor $SF_{RI}$ given by $$SF_{RI} = \frac{y_{ac,o} - y_o}{y_{ac} - y_o} \cdot \frac{|x_{ac} - x_o|}{|x_{ac,o}(s) - x_o|}$$

a Range Offset $R_p$ given by $$R_p = |x_{ac} - x_o| - \frac{1}{SF_{RI}}[|x_{ac,o}(s) - x_o| - R_s]$$

a phase adjustment given by $$r(X_{ac,o}(s), X_T) = e^{i(SFRI)\phi real(x_{ac},xT)}e^{-i4\pi/\lambda R_p}$$

where $$x_{ac,o}(s) = s\cos(\theta_{tilt})\hat{x} + y_{ac,o}\hat{y} + z_{ac,o}\hat{z} + s\sin(\theta_{tilt})\hat{z}$$

$x_{ac,o}$, $y_{ac,o}$ and $z_{ac,o}$ show an aircraft position, $x_o$, $y_o$ and $z_o$ show an initial aircraft position in the $\hat{x}$, $\hat{y}$, $\hat{z}$ direction respectively, and $\lambda$ is an operating wavelength of said radar, $X_T$ is radar target location and $R_S$ is an initial range.

DETAILED DESCRIPTION OF THE INVENTION

The present invention describes a method for motion compensating pulses for clearer SAR images.

Figure 1:
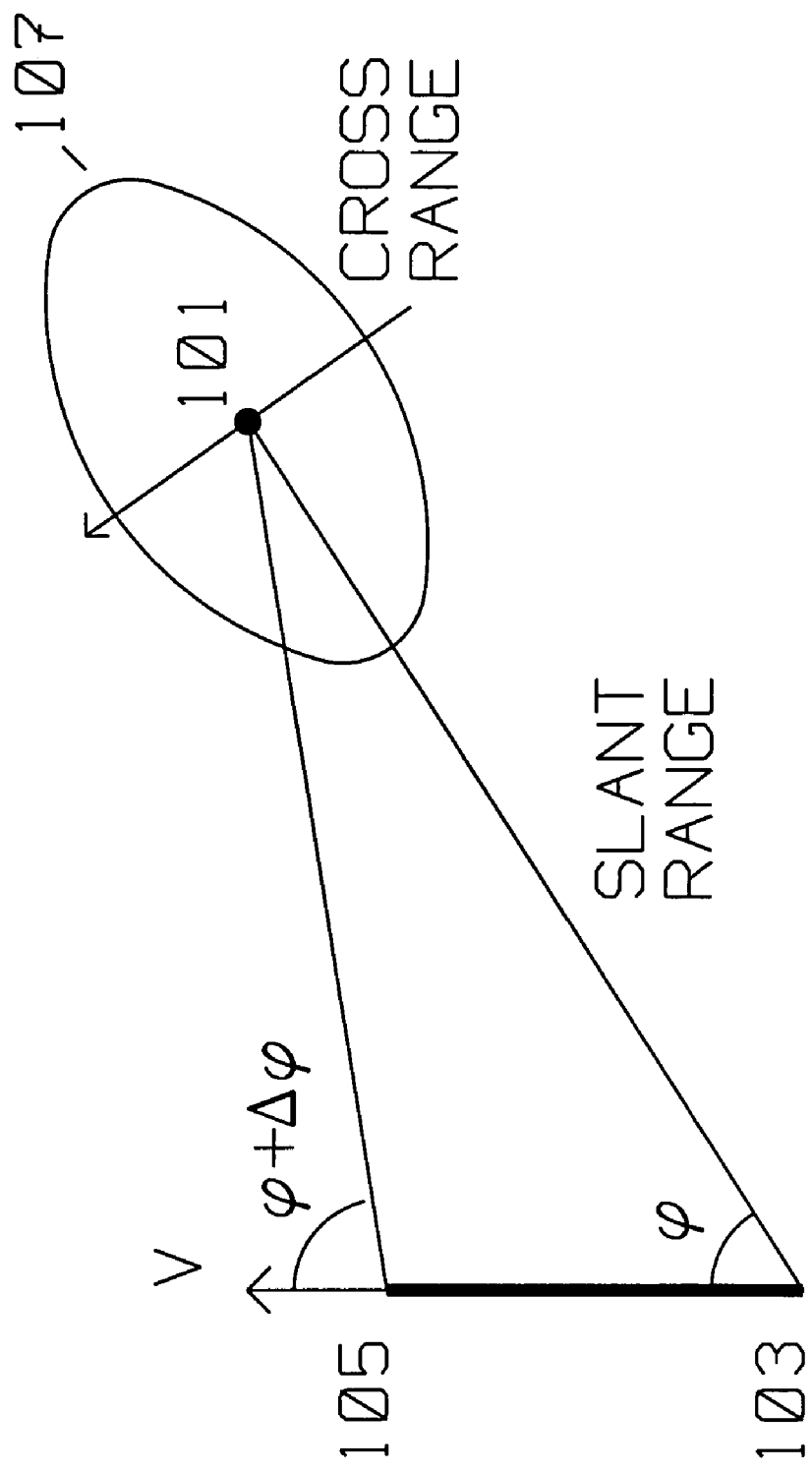
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during the frame length, and includes target area 101. Similarly, the antenna receive pattern covers area 107, and includes target area 101. Radar pulses are transmitted and corresponding returns received at many points during the frame length between position 103 and position 105. SAR radar is well known in the art and described by W. Carrara, et al, in *Spotlight Synthetic Aperture Radar*, Artech house, 1995, incorporated herein be reference in its entirety.

One requirement of focusing the return forming a SAR image is the ability to locate a designated target with high accuracy, typically in geodetic coordinates of the earth: latitude, longitude and altitude. This process is called mensuration.

Motion compensation is the process of digital correction of radar phase error for each radar return in a SAR frame forming a SAR image due to non-linear or non-uniform aircraft motion, such as buffeting or pilot commanded maneuvers. Motion compensation is performed in the airborne processor on each radar return. The exact form of motion compensation depends on the method used to compile the SAR image from the radar returns. A popular algorithm is the Range Migration Algorithm (RMA), a convolutional algorithm. Another, more mature method is the Polar Format algorithm. RMA is preferred because it is better suited to many advanced image analysis techniques such as coherent change detection. One assumption in RMA is that the nominal flight path of the aircraft during the SAR frame is in a straight line parallel to the centerline of the scene being acquired. This condition is not necessarily true. The deviation from a parallel path influences a SAR image more negatively for long range maps at high squint angles.

This invention corrects radar returns for the case where aircraft motion is not parallel to the scene centerline.

Figure 3:
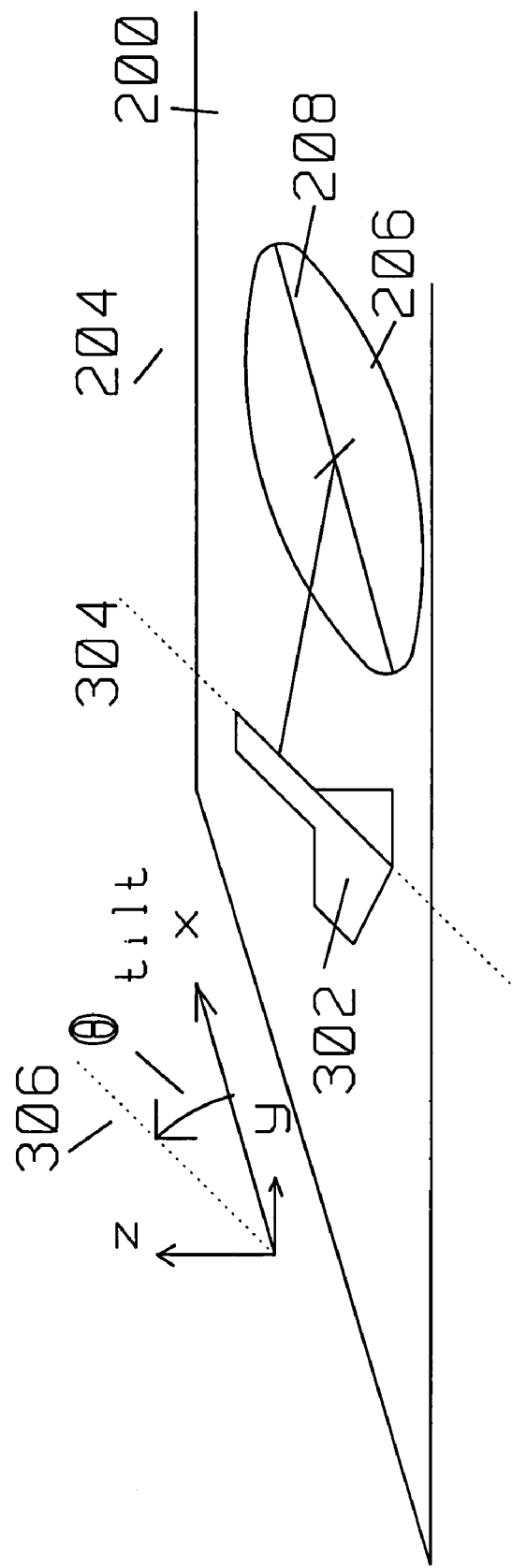
FIG. 3 is shows the path of a flying aircraft deviating from the ideal path for acquiring a SAR image, the deviation being corrected in the SAR returns by the present invention.

For the method described herein, and shown in FIG. 3, it is assumed that the aircraft path is:

a) a straight line NOT in a plane parallel to the plane of the scene assuming the scene is part of a horizontal, flat surface;

b) a small deviation from a straight line flight path due to mild maneuvers and buffeting.

The method herein compensates for non-parallel motion by resampling range measurements and resampling pulse to pulse times to render the data equivalent to a straight line, centerline-parallel path. The method is applicable to any SAR processing of the convolutional type.

There are two inputs and three outputs, typically to be used with the RMA focusing method. The two inputs are:

a) Current aircraft position in an x, y, z Cartesian coordinate system: $x_{ac}$, $y_{ac}$, $z_{ac}$ b) Scene center reference point vector, for center point located at $x_o$, $y_o$, $z_o$, defined as $x_o = x_o \hat{x} + y_o \hat{y} + z_o \hat{z}$ The three output are:

a) Range offset, $R_p$, that is the amount of range that particular return has to be shifted, or compensated for in accordance with this invention;

b) Ideal aircraft position parameter s;

c) Fast time scaling (resampling) factor $SF_{RI}$

The three outputs are used by the aircraft internal SAR processor to adjust the phase of each (digitized) return.

For a better understanding of the algorithm, it is first presented under Baseline Condition where there is no tilt to the aircraft path with respect to the plane of the scene. That is, the aircraft carrying the imaging SAR radar is following a straight and level path, the path parallel to the plane of the scene and parallel to the centerline of the scene being acquired as a SAR image.

I. Baseline Condition

Figure 2:
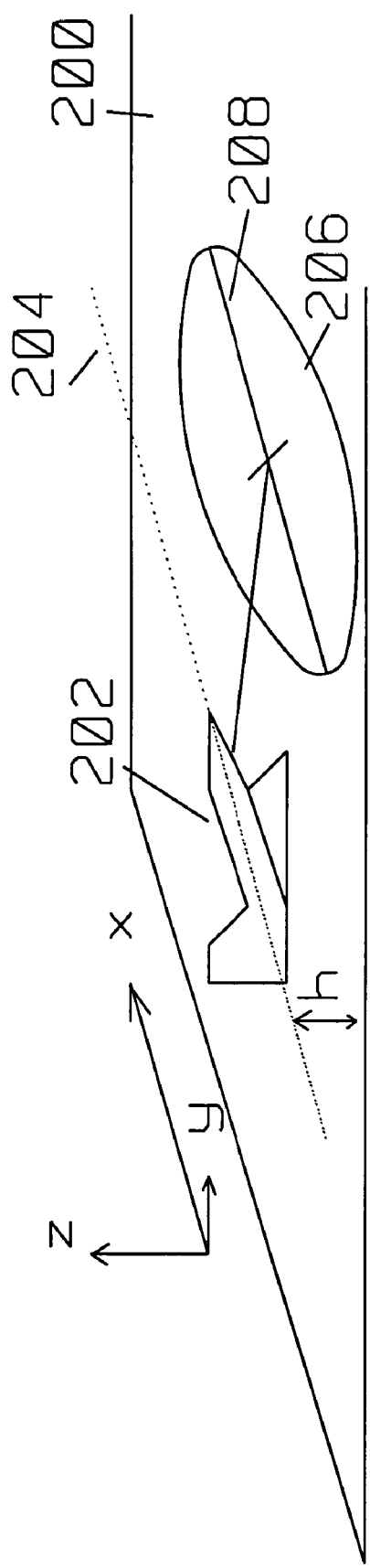
FIG. 2 shows a path of a flying aircraft defining an ideal, straight and level path along the centerline of a scene to be acquired for a SAR image, a baseline case for the acquisition of said SAR image of a scene in spotlight mode.

Aircraft ideal track is a straight line, the scene is flat, in a plane parallel to the flight track, as shown in FIG. 2. Aircraft 202 is following flight path 204 in the x direction, at an altitude h above flat area 200 and acquiring SAR image of scene 206. Scene 206 has a centerline 208, where centerline 208 is parallel to flight path 204. In FIG. 2, x direction is the direction of flight.

y direction is perpendicular to x, parallel to the plane of the scene being imaged.

z direction is normal to the plane of the scene, defined by $\hat{z} = \hat{x} \times \hat{y}$ With these definitions, the nominal flight track of the aircraft is $x_{ac,o}(s) = s\hat{x} + y_{ac,o} \hat{y} + z_{ac,o} \hat{z}$ where $y_{ac,o}$ and $z_{ac,o}$ are constants as it is assumed that the moving platform flies generally straight and level with minor deviations during the duration of the SAR frame resulting in a SAR image of scene 206. The deviations from the straight and level are due to buffeting, pilot inputs, atmospheric conditions or the like.

The target surface, or scene parameterization is:

$x_{ac,o} = x\hat{x} + y\hat{y}$

The scene central reference point vector is $x_o = x_o\hat{x} + y_o\hat{y} + z_o\hat{z}$ The actual aircraft position is given by ($x_{ac}$, $y_{ac}$, $z_{ac}$)
The actual radar return from a target at location $x_T$ is:

$$r_{real}(x_{ac}, x_T) = e^{i\phi_{real}(x_{ac}, x_T)} \quad \text{(Bsln1)}$$

$$\phi_{real}(x_{ac,}, x_T) = \frac{4\pi}{\lambda} |x_{ac} - x_T| \quad \text{(Bsln2)}$$

Aircraft position parameter is $$s = x_o + \frac{x_{ac} - x_o}{y_{ac} - y_o}(y_{ac,o} - y_o) \quad \text{(Bsln3)}$$

Fast time scale factor $$SF_{RI} = \frac{y_{ac,o} - y_o}{y_{ac} - y_o} \cdot \frac{|x_{ac} - x_o|}{|x_{ac,o}(s) - x_o|} \quad \text{(Bsln4)}$$

Range Offset $$R_p = |x_{ac} - x_o| - \frac{1}{SF_{RI}}[|x_{ac,o}(s) - x_o| - R_s] \quad \text{(Bsln5)}$$

$R_s$ is the initial range.

Best Approximation for phase adjustment for returns assuming straight and level platform (aircraft) track $$r(x_{ac,o}(s), x_T) = e^{i(SF_{RI})\phi_{real}(x_{ac}, x_T)} e^{-i4\pi/\lambda R_p} \quad \text{(Bsln6)}$$

where $x_{ac,o}(s) = s\hat{x} + y_{ac,o}\hat{y} + z_{ac,o}\hat{z}$

II. Tilted Aircraft Track

FIG. 3 shows aircraft 302 (or moving platform) flying a track 304 that is no longer parallel to flat area 200. Phase corrections for radar returns are re-calculated for conditions present in FIG. 3. Aircraft track 304 projected on the y, z plane shows climbing direction 306 of plane 302 with respect to the horizontal. Track 304 is still a straight line, but at an angle $\theta_{tilt}$ with respect to horizontal flat area 200 and the scene 206 thereon. Scene 206 being imaged is in a horizontal flat plane, part of flat area 200.

In FIG. 3, aircraft track 304 and flat plane 200 are no longer parallel, but rather at a tilt angle $\theta_{tilt}$ as shown. Now, the nominal flight track 304 of aircraft 302 in FIG. 3 (using the same coordinate system as in FIG. 2) is:

$$x_{ac,o}(s) = s\cos(\theta_{tilt})\hat{x} + Y_{ac,o}\hat{y} + z_{ac,o}\hat{z} + s\sin(\theta_{tilt})\hat{z} \qquad (1)$$

where $\theta_{tilt}$ is the angle formed by the aircraft track and the horizontal flat plane where the image is being acquired.

Following the same steps as in the baseline, the aircraft position parameter s is given by:

$$s = \frac{1}{\cos(\theta_{tilt})}\left[x_o + \frac{x_{ac} - x_o}{y_{ac} - y_o}(y_{ac,o} - y_o)\right] \qquad (2)$$

Fast time Scale Factor is $$SF_{RI} = \frac{y_{ac,o} - y_o}{y_{ac} - y_o} \cdot \frac{|x_{ac} - x_o|}{|x_{ac,o}(s) - x_o|} \qquad (3)$$

Range offset is $$R_p = |x_{ac} - x_o| - \frac{1}{SF_{RI}}[|x_{ac,o}(s) - x_o| - R_s] \qquad (4)$$

Approximation of the ideal return is given by $$r(x_{ac,o}(s), x_T) = e^{i(SF_{RI})\phi_{real}(x_{ac}, x_T)} e^{-i4\pi/\lambda R_p} \qquad (5)$$

where $$x_{ac,o}(s) = s\cos(\theta_{tilt})\hat{x} + y_{ac,o}\hat{y} + z_{ac,o}\hat{z} + s\sin(\theta_{tilt})\hat{z} \qquad (6)$$

By applying the approximation of the ideal return in equation (5) to the digitized radar returns from the scene being imaged in the SAR processor, the returns will be phase corrected for the motion shown in FIG. 3.

All references cited in this document are incorporated herein in their entirety by reference.

Although presented in exemplary fashion employing specific embodiments, the disclosed structures are not intended to be so limited. Although $\theta_{tilt}$ is shown for a climbing aircraft track 304, it also applies for a diving angle. Similarly, the same phase corrections apply for sonar returns, where typically a submarine is substituted for moving aircraft 302.

Those skilled in the art will also appreciate that numerous changes and modifications could be made to the embodiment described herein without departing in any way from the invention.

The invention claimed is:

1. A radar for acquiring a synthetic aperture image of a scene, said scene having one or more radar scatterers located on a horizontal flat $\hat{x},\hat{y}$ plane, said radar system mounted on a moving platform moving at an angle $\theta_{tilt}$ with respect to said $\hat{x},\hat{y}$ plane, with a component of motion in a $\hat{z}$ direction, said $\hat{z}$ direction perpendicular to said $\hat{x},\hat{y}$ plane, said radar comprising:

a radar receiver for digitizing radar returns having a phase from said scene, and a computer for adjusting said phase of said radar returns in response to said $\theta_{tilt}$ to generate phase adjusted returns and computing said synthetic aperture image from said phase adjusted returns.

2. A radar system as described in claim 1 wherein said phase of said radar returns is adjusted by computing a nominal aircraft track $x_{ac,o}(s)$ given by $$x_{ac,o}(s) = s\cos(\theta_{tilt})\hat{x} + y_{ac,o}\hat{y} + z_{ac,o}\hat{z} + s\sin(\theta_{tilt})\hat{z};$$

an aircraft position parameter s given by $$s = \frac{1}{\cos(\theta_{tilt})}\left[x_o + \frac{x_{ac} - x_o}{y_{ac} - y_o}(y_{ac,o} - y_o)\right];$$

a Fast Time Scale Factor $SF_{RI}$ given by $$SF_{RI} = \frac{y_{ac,o} - y_o}{y_{ac} - y_o} \cdot \frac{|x_{ac} - x_o|}{|x_{ac,o}(s) - x_o|};$$

a Range Offset $R_p$ given by $$R_p = |x_{ac} - x_o| - \frac{1}{SF_{RI}}[|x_{ac,o}(s) - x_o| - R_s];$$

a phase adjustment given by $$r(x_{ac,o}(s), x_T) = e^{i(SF_{RI})\phi_{real}(x_{ac}, x_T)} e^{-i\frac{4\pi}{\lambda}R_p};$$

where $x_{ac,o}$, $y_{ac,o}$ and $z_{ac,o}$ show an aircraft position, $x_o$, $y_o$ and $z_o$ show an initial aircraft position in the $\hat{x},\hat{y},\hat{z}$ direction respectively, and $\lambda$ is an operating wavelength of said radar, $x_T$ is radar target location and $R_s$ is an initial range.

3. A method for acquiring a synthetic aperture image of a scene using a radar system, said scene having one or more radar scatterers located on a horizontal flat $\hat{x},\hat{y}$ plane, said radar system mounted on a moving platform moving at an angle $\theta_{tilt}$ with respect to said $\hat{x},\hat{y}$ plane, with a component of motion in a $\hat{z}$ direction, said $\hat{z}$ direction perpendicular to said $\hat{x},\hat{y}$ plane, said method comprising the steps of:

digitizing radar returns having a phase from said scene;

adjusting said phase of said radar returns in response to said $\theta_{tilt}$ to generate phase adjusted returns;

computing said synthetic aperture image from said phase adjusted returns.

4. A method as described in claim 3 wherein said phase of said radar returns is adjusted by computing a nominal aircraft track $x_{ac,o}(s)$ given by $$x_{ac,o}(s) = s\cos(\theta_{tilt})\hat{x} + y_{ac,o}\hat{y} + z_{ac,o}\hat{z} + s\sin(\theta_{tilt})\hat{z};$$

an aircraft position parameter s given by $$s = \frac{1}{\cos(\theta_{tilt})}\left[x_o + \frac{x_{ac} - x_o}{y_{ac} - y_o}(y_{ac,o} - y_o)\right];$$

a Fast Time Scale Factor $SF_{RI}$ given by $$SF_{RI} = \frac{y_{ac,o} - y_o}{y_{ac} - y_o} \cdot \frac{|x_{ac} - x_o|}{|x_{ac,o}(s) - x_o|};$$

a Range Offset $R_p$ given by $$R_p = |x_{ac} - x_o| - \frac{1}{SF_{RI}}[|x_{ac,o}(s) - x_o| - R_s];$$

a phase adjustment given by $$\Gamma(x_{ac,o}(s), x_T) = e^{i(SF_{RI})\Phi_{real}(x_{ac}, x_T)} e^{-i4\pi/\lambda R_p};$$

where $x_{ac,o}$, $y_{ac,o}$ and $z_{ac,o}$ show an aircraft position, $x_o$, $y_o$ and $z_o$ show an initial aircraft position in the $\hat{x}, \hat{y}, \hat{z}$ direction respectively, and $\lambda$ is an operating wavelength of said radar, $x_T$ is radar target location and $R_s$ is an initial range.

* * * * *